United States Patent [19]
Hooijmans et al.

[11] Patent Number: 5,390,185
[45] Date of Patent: Feb. 14, 1995

[54] TRANSMISSION SYSTEM FOR A COMBINATION OF A MAIN SIGNAL AND AN AUXILIARY SIGNAL

[75] Inventors: Pieter W. Hooijmans; Petrus P. G. Mols; Markus T. Tomesen, all of Eindhoven, Netherlands

[73] Assignee: U.S. Philips Corporation, New York, N.Y.

[21] Appl. No.: 134,245

[22] Filed: Oct. 8, 1993

[30] Foreign Application Priority Data

Oct. 9, 1992 [EP] European Pat. Off. ........... 92203107

[51] Int. Cl.6 .................... H04J 14/02; H04J 14/06
[52] U.S. Cl. .................... 370/98; 370/110.1; 370/110.4; 359/124; 359/156; 359/187
[58] Field of Search ............... 370/74, 76, 98, 110.1, 370/110.4, 78; 359/110, 122, 124, 156, 181, 187, 192; 455/214

[56] References Cited

U.S. PATENT DOCUMENTS

| | | | |
|---|---|---|---|
| 4,471,494 | 9/1984 | Keil et al. | 359/187 X |
| 4,524,462 | 6/1985 | Cottatelucci | 359/124 |
| 4,716,563 | 12/1987 | Roust | 370/110.4 |
| 4,763,326 | 8/1988 | Krick | 370/110.4 |
| 4,972,408 | 11/1990 | Le Bihan Hervé et al. | 370/112 X |

FOREIGN PATENT DOCUMENTS

| | | | |
|---|---|---|---|
| 0142811 | 12/1978 | Japan | 370/110.4 |
| 62-141812 | 6/1987 | Japan . | |
| 0011032 | 1/1990 | Japan | 370/98 |
| 2039447 | 8/1980 | United Kingdom | 370/110.4 |

OTHER PUBLICATIONS

Q. Jiang, "Channel Selection and Identification for Coherent Optical FDM Systems", IEEE Photonics Technology Letters, vol. 3, No. 8, Aug. 1991, pp. 767–768.

J. A. Kitchen and P. Cochrane, "A Novel Service/Supervisory Channel for Digital Trunk Transmission Systems," Second International Conference on Telecommunication Transmission Into the Digital Era, London, England (17–20 Mar. 1981), pp. 159–163.

Primary Examiner—Melvin Marcelo
Attorney, Agent, or Firm—Leroy Eason

[57] ABSTRACT

A transmission system includes a transmitter for transmitting to a communication channel a send signal which is a combination of a main signal and an auxiliary signal. The send signal is received by a receiver which recovers the auxiliary signal therefrom, and which includes a frequency control loop having a bandwidth which is larger than that of the auxiliary signal. Recovery of the auxiliary signal by a frequency control loop reduces the complexity of the receiver. By including a series of digital symbols in the auxiliary signal, it is possible to send additional information along with the main signal without requiring any significant increase in complexity of the transmission system.

15 Claims, 3 Drawing Sheets

TRANSMISSION SYSTEM FOR A COMBINATION OF A MAIN SIGNAL AND AN AUXILIARY SIGNAL

BACKGROUND OF THE INVENTION

1. Field of the Invention

The invention relates to a transmission system comprising a transmitter for supplying a send signal to a transmission channel, the send signal being a combination of a main signal and an auxiliary signal, a receiver for deriving a received signal from the transmission channel corresponding to the send signal. The receiver includes a control system which comprises means for comparing the difference between a parameter of the received signal and a reference value, means for deriving a correction signal from the difference signal, and means for reducing the difference signal in response to the correction value, The receiver also comprises means for deriving the auxiliary signal from the difference signal, the frequency spectrum of the auxiliary signal being largely situated in the bandwidth of the control system.

The invention likewise relates to a receiver to be used in such a transmission system.

2. Description of the Related Art

A transmission system as defined in the opening paragraph is known from the published article "Channel Selection and Identification for Coherent Optical FDM Systems" by Q. Jiang in IEEE Photonits Technology Letters, Vol. 3, No 8, August 1991, pp. 267-268.

Such transmission systems may be used for transmitting signals through glass fibres, radio links or line links. Such systems may also be used for restoring signals that have been recorded on a recording medium such as, for example, magnetic tape or a magnetic or optical disc.

In systems of this type there is sometimes a desire to add an auxiliary signal, for example, in the form of a pilot tone. This is effected by varying a parameter of the send signal in response to the auxiliary signal. Such a pilot tone may be used, for example, for amplitude or frequency control of the received signal. Alternatively, it is conceivable that the pilot tone can be used for deriving a signal having a certain frequency and which is necessary for processing the main signal.

In order to avoid the reception of the main signal from being too strongly affected by the presence of the auxiliary signal (pilot tone), the receiver of the known transmission system comprises a control system to reduce the variations of the parameter of the received signal which is used for transmitting the auxiliary signal. In the known transmission system the auxiliary signal is transmitted by frequency modulation of an optical carrier. The control system in the receiver is in this case a frequency control system wherein the comparing means comprise a frequency discriminator and the correction means comprise the local laser the frequency of which is adjusted in response to the correction signal. This frequency adjustment of the local laser reduces frequency variation of the received signal due to the presence of the auxiliary signal to a value which no longer is a disturbing factor in the reception of the main signal. In order to make this possible the frequency spectrum of the auxiliary signal must lie in the bandwidth of the control system, because otherwise the control system will be incapable of keeping track of the variations caused by the auxiliary signal in the parameter of the received signal. In this connection the bandwidth of the control system is meant to be understood as the maximum frequency of variations of the characteristic magnitude of the received signal which variations can still be reduced by the control system.

In the transmission system known from said the above-identified article a pilot tone is added to identify the transmitter. Each transmitter in the transmission system sends out a pilot tone with a frequency associated with that particular transmitter. From the pilot tone frequency the receiver can therefore establish which transmitter is being received. However, it is impossible to transmit further information in addition to the transmitter identification.

SUMMARY OF THE INVENTION

It is an object of the invention to provide, a transmission system as defined in the opening paragraph in which it is possible to co-transmit additional information.

For this purpose, the invention is characterized in that the auxiliary signal comprises a series of digital symbols for transmitting auxiliary information.

By substituting for a pilot a series of digital symbols as an auxiliary signal tone, any other desired information in addition to transmitter identification can be accommodated in the auxiliary signal, and the complexity of the receiver is not enhanced appreciably.

The known transmission system further has the problem that with a large number of transmitters in the a large number of pilot tones are necessary. This means that considerable bandwidth is necessary for transmitting the pilot tones.

The use of a series of digital symbols as an auxiliary signal has the additional advantage that a large number of pilot tones is now no longer necessary, since the transmitters may now be identified by to a series of digital symbols present in the auxiliary signal and associated with the transmitters.

An embodiment of the invention is characterized in that the means for deriving the auxiliary signal from the difference signal comprises the means for deriving the correction signal from the difference signal.

By using the means for deriving the correction signal from the difference signal also as the means for deriving the auxiliary signal from the difference signal, it is achieved that a sufficiently strong auxiliary signal is still available even if the control system has a high loop gain, despite the fact that the control system then reduces the difference signal to a small value.

A further embodiment of the invention is characterized in that the transmitter comprises a modulator for providing the auxiliary signal by modulating the series of digital symbols on a subcarrier, and in that the receiver comprises a demodulator for deriving the auxiliary signal from the difference signal.

By modulating the series of digital symbols on a subcarrier it is avoided that recovery of the auxiliary signal from the difference signal will be disturbed by the presence of an unknown constant term (offset) in the difference signal. This unknown term may be caused, for example, by a statistical deviation of the parameter of the received signal relative to the reference value.

A further embodiment of the invention is characterized in that the transmitter comprises a frequency modulator for frequency modulating the send signal in accordance with the auxiliary signal, and the control system is a frequency control system for bringing the mean frequency of the received signal to a reference value.

By modulating the auxiliary signal on the send signal by frequency modulation, the frequency control system which is already available in the receiver can also be used for deriving the auxiliary signal from the received signal.

A further embodiment of the invention is characterized in that the transmitter comprises means for modulating the amplitude of the send signal in response to the auxiliary signal, and in that the control system is an amplitude control system to bring the mean amplitude of the received signal to a reference value.

By transmitting the auxiliary signal as amplitude modulation of the send signal, the amplitude control system already available in the receiver may also be jointly used for deriving the auxiliary signal from the received signal.

A further embodiment of the invention is characterized in that the receiver comprises means for reducing the difference between the polarization direction of the output signal of the channel and a reference polarization direction in response to the auxiliary signal, so that an auxiliary signal of maximum amplitude is obtained.

There are types of receivers whose sensitivity depends on the polarization direction of the channel output signal. They are, for example, optical homodyne or heterodyne receivers. In these receivers the channel output signal is mixed with a locally generated optical signal so as to obtain an intermediate frequency signal that can be further processed. For realizing optimum sensitivity, such a receiver may comprise a polarization control for reducing the difference between the polarization direction of the channel output signal and the reference polarization direction.

By controlling the polarization of the received signal in response to the auxiliary signal, it is achieved that for the polarization control a signal is available having a higher signal-to-noise ratio than if the main signal were used for the polarization control. This higher signal-to-noise ratio enhances the reliability of the operation of the polarization control.

BRIEF DESCRIPTION OF THE DRAWINGS

The invention will now be further explained with reference to the drawing figures in which.

DESCRIPTION OF THE PREFERRED EMBODIMENTS

Figure 1:
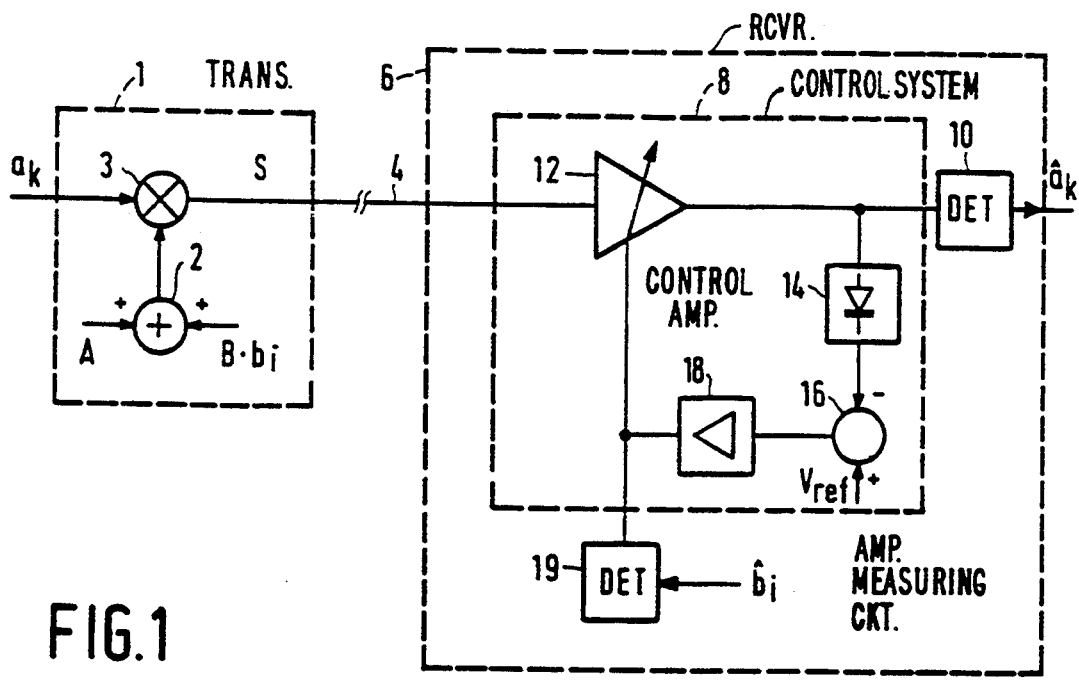
FIG. 1 shows a first transmission system according to the invention.

In the transmission system shown in FIG. 1 the main signal to be transmitted, in this case a series of digital symbols $a_k$, is applied to a transmitter 1. In the transmitter 1 the series of symbols $a_k$ is applied to a first input of a multiplier 3 which is used here as an amplitude modulator. A series of digital symbols $b_i$, the auxiliary signal, is applied to a first input of an adder circuit 2. A second input of the adder circuit 2 is supplied with a consrot A. The output of the adder circuit 2 is connected to a second input of the multiplier 3. The output of the multiplier 3 presents the send signal which is a combination of the main signal and the auxiliary signs.

The send signal is fed to the channel 4. The output signal of the channel 4 is applied to the receiver 6.

In the receiver 6 the output signal of the channel 4 is applied to an input of a controllable amplifier 12. The output of the controllable amplifier 12 is connected to an amplitude measuring circuit 14 and an input of a detector 10. The output of the amplitude measuring circuit 14 is connected to a negative input of comparing means, in this case a subtracter circuit 16. A reference value $V_{ref}$ to a positive input of the subtracter circuit 16. The output of the subtracter circuit 16, having the difference signal for an output signs, is connected to an input of the deriving means for deriving the correction signal from the difference signal, in this case being a consol amplifier 18. The output of the control amplifier 18, carrying the colorlon signal as its output signal, is connected to a control input of the correction means in this case being the controllable amplifier 12. The output of the control amplifier 18 is additionally connected to the deriving means for deriving the auxiliary signal from the difference signal, the deriving means in this case comprising a detector 19.

The control system 8 according to the inventive idea comprises the controllable raplifter 12, the amplitude measuring circuit 14, the subtracter circuit 16 and the control amplifier 18.

The output of the detector 10 presents the series of symbols $a_k$, and the series of symbols $b_i$ may be tapped from the output of the detector 19.

If is assumed that the digital symbols $a_k$ and $b_i$ may adopt the binary values $+1$ and $-1$, and the consrot B is smiler the the constant A, the output of the multiplier circuit 3 presents a send signal consisting of a signal which is proportional to the values of the symbols $a_k$ and whose amplitude is modulated by the symbols $b_i$. For this send signal there may be written $S = (A + B \cdot b_i) \cdot a_k$. At the output of the channel there is then a signal available whose amplitude is modulated by the symbols $b_i$ which signal carries the symbols $a_k$. In the transmission system as shown in FIG. 1 the control system 8 is an amplitude control system controlling the amplitude of the output signal of the controllable amplifier to a constant value. If the bandwidth of the control system exceeds that of the auxiliary signal in the form of the symbols $b_i$, this control system will provide that the amplitude modulation of the received signal by the series of symbols $b_i$ is removed, so that the output of the controllable amplifier 12 presents a received signal which is (substantially) free from amplitude modulation. From this received signal an estimate $a_k$ of the transmitted symbols $a_k$ may be simply obtained by means of the detector 10.

The amplitude measuring circuit 14 determines the amplitude of the output signal of the controllable amplifier 12. The subtracter circuit 16 determines the difference signal between the measured value of the amplitude of the received signal and the reference value $V_{ref}$. The difference signal is amplified to the correction signal by the control amplifier 18. The control amplifier 18 usually has a low-pass characteristic, so that the control system 8 usually has a limited bandwidth. The control amplifier, however, may also be arranged as an integrator which is advantageous in that the control system has a high loop gain for low frequencies. The correction signal is now used for adjusting the gain factor of the controllable amplifier 12 so that the amplitude modulation of the output signal of the amplifier 12 is strongly reduced relative to the amplitude modulation of the input signal of this amplifier 12. For this purpose, the correction signal is a signal which is proportional to the amplitude modulation of the channel output signal. This property provides that the correction signal comprises an auxiliary signal and, as a result, this auxiliary signal may be simply derived from the correction signal by means of the detector 19. The detectors 10 and 19 may be simply formed by a comparator which compares the relevant input signal with a reference value and produces a logic value $+1$ or $-1$ in dependence on the result of the comparison.

Figure 2:
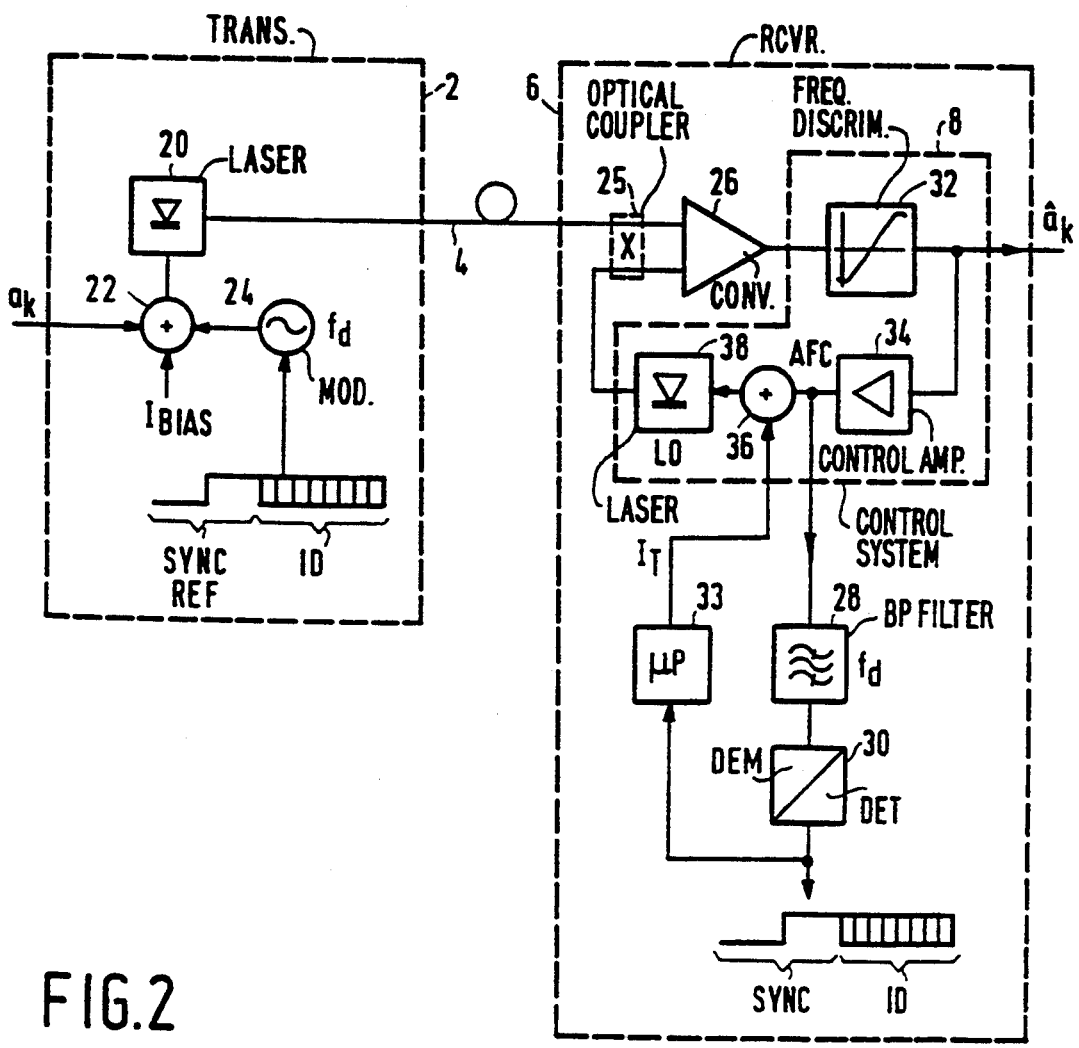
FIG. 2 shows an optical heterodyne transmission system in which the invention is used.

In the transmission system as shown in FIG. 2 the auxiliary signal, being a series of digital symbols $b_i$ comprising a channel identification, is applied to an FSK modulator 24 for FSK modulation of a subcarder with frequency $f_d$ in response to the auxiliary signal. The output of the modulator 24 is connected to a first input of an adder circuit 22. The main signal, in this case being a series of digital symbols $a_k$, is applied to a second input of an adder circuit 22. A constant value $I_{bias}$ is applied to a third input of the adder circuit 22. The output of the adder circuit 22 is connected to a frequency control input of a laser 20.

The output of the laser 20, likewise forming the output of transmitter 2, forms the send signal and is applied to the input of the channel, in this case a glass fibre 4. An output of the glass fibre 4 is connected to an input of the receiver 6. In the receiver 6 the output of the glass fibre 4 is connected to a first input of an optical coupling element 25. The output of a local laser 38 is connected to a second input of the optical coupling element 25. Two outputs of the optical coupling element 25 are connected to two inputs of an optoelectric converter 26. The output of the optoelectric converter 26 is connected to an input of comparing means, in this case a frequency discriminator 32. The output of the frequency discriminator 32 carrying the difference signal for its output signal is connected to an input of a control amplifier 34. In addition, the output of the frequency discriminator 32 presents a signal which can be directly used for deriving the symbols $a_k$.

The output of the control amplifier 34 is connected to an input of a bandpass filter 28 and to a first input of an adder circuit 36. The output of the adder circuit 36 is connected to a frequency control input of the local laser 38. The control system 8 according to the inventive idea is here a frequency control system and comprises the coupling element 25, the optoelectric converter 26, the frequency discriminator 32, the control amplifier 34, the adder circuit 36 and the local laser 38.

An output of the bandpass filter 28 is connected to a demodulator for deriving the auxiliary signal from the difference signal, the alemodulator here being an FSK demodulator/detector 30. At the output of the demodulator/detector 30 a series of symbols $b_i$ is available. The output of the FSK demodulator 30 is connected to an input of a microprocessor 33. An output of the microprocessor 33 is connected to a second input of the adder circuit 36.

In the transmitter 2 channel identification is accommodated in the series of digital symbols $b_i$. This channel identification may comprise the (mean) frequency of the light emitted by the laser 20, but also, for example, a channel number. The series of digital symbols is modulated on a subcarder having frequency $f_d$ by the FSK modulator. The modulated subcarrier is added to the series of digital symbols $a_k$ and to the constant $I_{bias}$ by the adder circuit 22. The frequency of the light generated by the laser is modulated by the output signal of the adder circuit 22.

The receiver 6 is an optical heterodyne receiver. This means that in this receiver the received light signal has a frequency of, for example, $2.10^{14}$ Hz and is converted to a much lower intermediate frequency of, for example, $10^9$ Hz. For this purpose, the optical coupling element 25 in the receiver couples the received light signal with the light signal generated by a local laser 38. As a result, a light signal is obtained at the outputs of the optical coupling element 25 which signal has amplitude variations due to interference between the two input signals of the optical coupling element. These amplitude variations have a frequency equal to the difference between the frequency of the received light signal and that of the locally generated light signal. The optoelectric converter 26 converts the amplitude variations of the light signal into an electrically processable intermediate frequency signal.

For simultaneous transport of more than a single signal through a glass fibre, various transmitters having different light frequencies can be coupled by the glass fibre. For selecting one of these transmitters at the receiver end, the frequency of the local laser 38 can be adjusted by means of a tuning signal $I_T$ supplied by the microprocessor 33. The value of the tuning signal is determined in response to a desired transmitter indicated by means of a control device.

The control system 8 is here a frequency control system which maintains the mean frequency of the intermediate frequency signal at a reference value. The frequency discriminator 32 supplies the difference signal which depends on the frequency of the intermediate frequency signal. For an intermediate frequency signal having a frequency below a specific reference value, the output signal of the frequency discriminator 32 is negative and for an intermediate frequency signal having a frequency above the reference value the output signal of the frequency discriminator 32 is positive. The difference signal is amplified to the correction signal by the control amplifier 34. The correction signal is used for adjusting the frequency of the local laser 38, so that the frequency of the intermediate frequency signal is adjusted in the direction of the reference value.

The FSK-modulated subcarder is filtered out of the correction signal by the bandpass filter 28. in the demodulator/detector 30 the demodulation and, subsequently, detection takes place of the auxiliary signal.

The auxiliary signal containing channel identification in this case is read by the microprocessor 33. The microprocessor 33 compares the channel identification with the expected channel identification in response to the desired transmitter made known by means of the control device. If the received channel identification matches the expected channel identification, the microprocessor need not take further action. However, if the two channel identifications differ, the microprocessor 33 adjusts the value of the tuning signal $I_T$ so as to tune the local laser 38 to the desired channel. In response to the difference between the two channel identifications there may be determined whether the frequency of the local laser 38 is to be increased or reduced. If with a newly adjusted value of $I_T$ another transmitter is received, them is another verification whether the channel identifications match and, if necessary, the value of $I_T$ is again adjusted.

Figure 3:
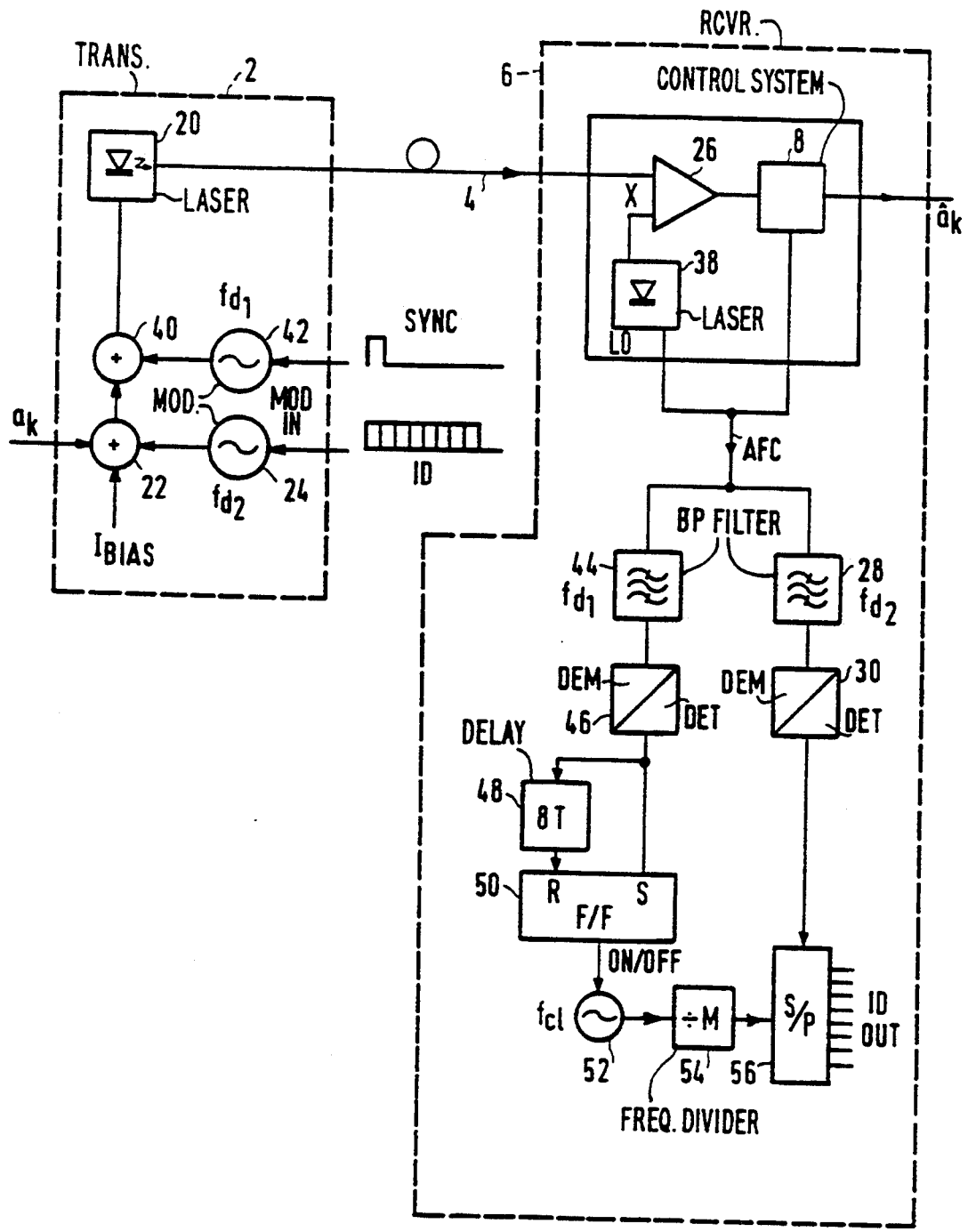
FIG. 3 shows an embodiment for the transmission system shown in FIG. 2 in which a separate synchronization signal is co-transmitted.

In the transmission system as shown in FIG. 3 a second auxiliary signal is applied to an adder circuit 40. This second auxiliary signal is a synchronizing pulse modulated in a modulator 42 on a second subcarder. This synchronizing pulse denotes the beginning of the channel identification in the first auxiliary signal. The second auxiliary signal is supplied to simplify the recovery of the channel identification in the receiver. The components occurring in both the transmission systems shown in FIG. 2 and FIG. 3, have already been explained with reference to FIG. 2.

In the receiver the second auxiliary signal is filtered out of the correction signal by the bandpass filter 44. After demodulation and detection in the detector 46 there is a synchronizing pulse present on the output of the detector 46. When the synchronizing pulse becomes active, a flip-flop is set. As a result, an oscillator 52 is started operating at a frequency that is a factor M as large as the symbol rate of the channel identification signal which is available on the output of the detector 30. At the output of the frequency divider 54, having dividing factor M, there is a signal available which has a frequency (Hz) that corresponds to the symbol rate (in bit/sec).

At the output of the frequency divider 54 each symbol of the channel identification signal is clocked by the clock signal in a serial-to-parallel converter 56. Once 8 symbols have been clocked in this serial-to-parallel converter, the output of the delay element 48 is activated and the flip-flop 50 is reset. Consequently, the oscillator 52 is stopped, which also happens when symbols are clocked in the serial-to-parallel converter 56. The channel identification is then available in parallel on the outputs of the serial-to-parallel converter, so that this identification may be taken over by the microprocessor 33 (FIG. 2).

Figure 4:
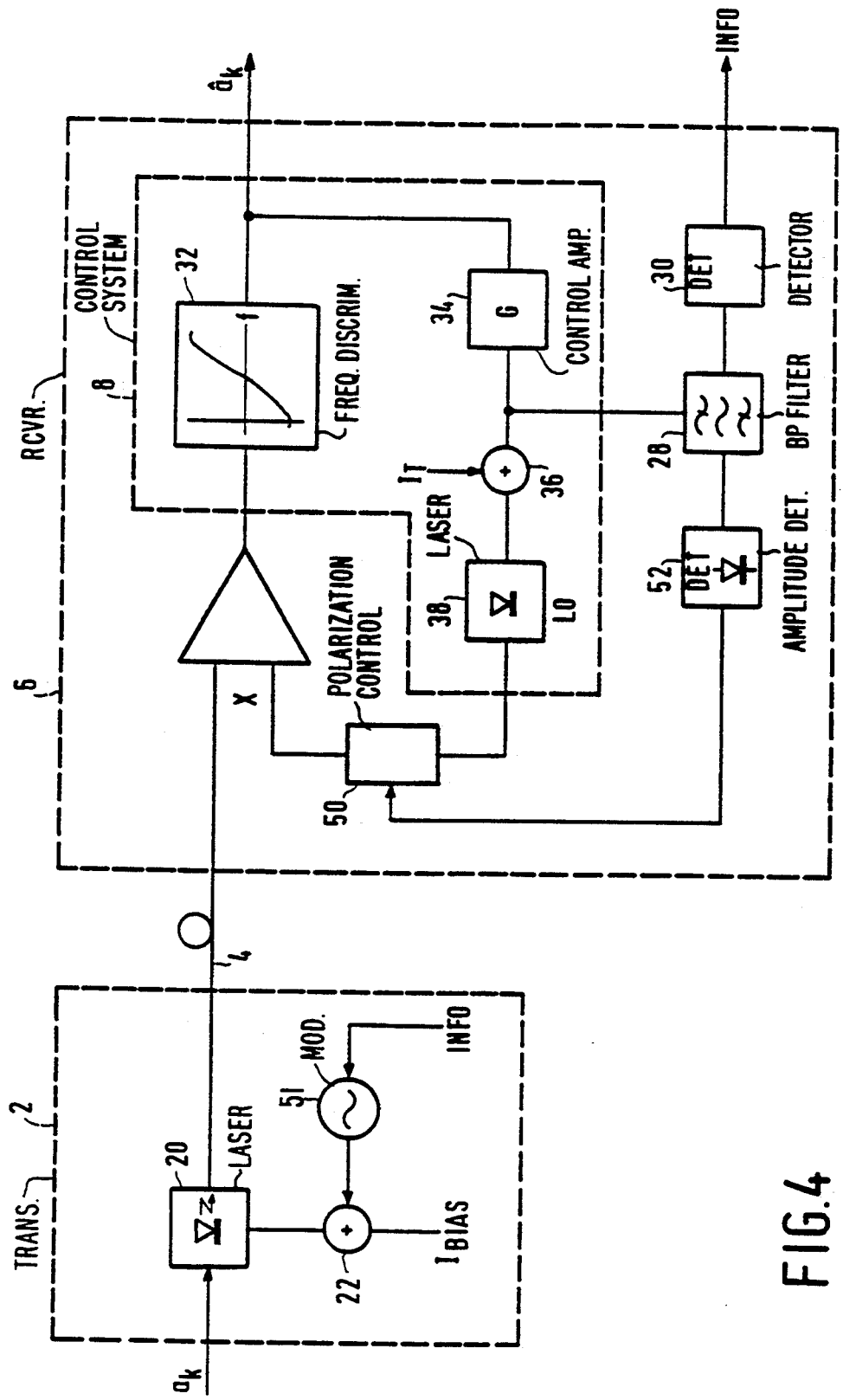
FIG. 4 shows an optical heterodyne transmission system in which the auxiliary signal is used for polarization control of the received optical signal.

The transmission system as shown in FIG. 4 is derived from the transmission system 2 in that the amplitude detector 52 as well as the polarization controller 50 have been added. Besides, the FSK modulator 24 is replaced by a FSK modulator 51. To have the mixing of the received light signal with the light signal of the local laser 38 accompanied with as little signal loss as possible, it is necessary for the polarization direction of the received light signal and the polarization direction of the locally generated light signal to be the same. Generally, the direction of polarization of the received light signal is indiscriminate, however, and not constant with time. Without precautionary measures the amplitude of the intermediate frequency signal may fluctuate between the maximum value (when both directions of polarization are the same) and substantially zero (when the two directions of polarization are orthogonal). In this situation the polarization direction of the light generated by the local laser is the reference polarization direction.

To provide that the polarization direction of the light generated by the local laser is always optimized, the amplitude detector 52 determines the power of the auxiliary signal and the polarization controller 50 adjusts the polarization of the light generated by the local laser, so that the power of the auxiliary signal is maximized. The advantage of the use of the auxiliary signal for controlling the polarization is that the auxiliary signal has a much lower bandwidth compared to the main signal, and hence a higher signal-to-noise ratio. This leads to a more reliable polarization control. It is noted that it is alternatively possible to reduce the difference between the polarization direction of the channel output signal and the reference polarization direction by turning the polarization direction of the channel output signal in lieu of turning the polarization direction of the light signal of the local laser. For transferring the auxiliary signal phase modulation is utilized here, because not more than one bandpass filter 28 is necessary then, so that any undesired differences occurring between the bandpass filters, which filters would be necessary for FSK modulation, do not have a detrimental effect on the polarization control.

We claim:

1. Transmission system comprising a transmitter for supplying a send signal to a transmission channel, the send signal being a combination of a main signal and an auxiliary signal, and a receiver for deriving a received signal from an output signal of the channel; said receiver including a control system which comprises: comparing means for deriving a difference signal corresponding to the difference value between a parameter of the received signal and a reference value, means for deriving a correction signal from the difference signal, and means for reducing the difference value in response to the correction signal; the receiver further including means for deriving the auxiliary signal from the difference signal, the frequency spectrum of the auxiliary signal being mainly situated in the bandwidth of the control system, the auxiliary signal comprising a series of digital symbols for conveying auxiliary information.

2. Transmission system as claimed in claim 1, characterized in that the means for deriving the auxiliary signal from the difference signal comprise the means for deriving the correction signal from the difference signal.

3. Transmission system as claimed in claim 1, characterized in that the transmitter comprises a modulator for producing the auxiliary signal by modulating the series of digital symbols on a subcarrier, and the receiver comprises a demodulator for deriving the auxiliary signal from the difference signal.

4. Transmission system as claimed in claim 1, characterized in that the transmitter comprises a frequency modulator for frequency modulating the send signal in response to the auxiliary signal, and the control system is a frequency control system for bringing the mean frequency of the received signal to a reference value.

5. Transmission system as claimed in claim 1, characterized in that the transmitter comprises means for modulating the amplitude of the send signal in response to the auxiliary signal, and the control system is an amplitude control system for bringing the mean amplitude of the received signal to a reference value.

6. Transmission system as claimed in claim 1, characterized in that the transmitter comprises means for including a channel identification in the auxiliary signal and the receiver comprises deriving means for deriving the channel identification from the auxiliary signal.

7. Transmission system as claimed in claim 2, characterized in that the transmitter comprises a modulator for producing the auxiliary signal by modulating the series of digital symbols on a subcarrier, and the receiver comprises a demodulator for deriving the auxiliary signal from the difference signal.

8. Transmission system as claimed in claim 2, characterized in that the transmitter comprises a frequency modulator for frequency modulating the send signal in response to the auxiliary signal, and the control system is a frequency control system for bringing the mean frequency of the received signal to a reference value.

9. Transmission system as claimed in claim 2, characterized in that the transmitter comprises means for modulating the amplitude of the send signal in response to the auxiliary signal, and the control system is an amplitude control system for bringing the mean amplitude of the received signal to a reference value.

10. Transmission system as claimed in claim 3, characterized in that the transmitter comprises a frequency modulator for frequency modulating the send signal in response to the auxiliary signal, and the control system is a frequency control system for bringing the mean frequency of the received signal to a reference value.

11. Transmission system as claimed in claim 3, characterized in that the transmitter comprises means for modulating the amplitude of the send signal in response to the auxiliary signal, and the control system is an amplitude control system for bringing the mean amplitude of the received signal to a reference value.

12. Transmission system comprising a transmitter for supplying a send signal to a transmission channel, the send signal being a combination of a main signal and an auxiliary signal, and a receiver for deriving a received signal from an output signal of the channel, which receiver has a sensitivity depending on the difference between the polarization direction of the channel output signal and a reference polarization direction; said receiver including a control system which comprises: comparing means for deriving a difference signal corresponding to the difference value between a parameter of the received signal and a reference value, means for deriving a correction signal from the difference signal, and means for reducing the difference value in response to the correction signal, the control system having a bandwidth which exceeds that of the auxiliary signal; the receiver further including means for deriving the auxiliary signal from the difference signal and means for reducing the difference between the polarization direction of the channel output signal and the reference polarization direction in response to the auxiliary signal, so as to obtain an auxiliary signal having maximum amplitude.

13. Receiver for deriving a received signal from a signal that is a combination of a main signal and an auxiliary signal, which receiver includes a control system comprising: means for deriving a difference signal corresponding to the difference between a parameter of the received signal and a reference value, means for deriving a correction signal from the difference signal, and means for reducing the difference value in response to the correction signal; the receiver further including means for deriving the auxiliary signal from the difference signal, the bandwidth of the control system exceeding that of the auxiliary signal, the auxiliary signal comprising a series of digital symbols for conveying auxiliary information.

14. Receiver as claimed in claim 13, characterized in that the auxiliary signal comprises a subcarrier modulated with said series of digital symbols, and the receiver comprises an auxiliary demodulator for deriving the auxiliary signal from the control system correction signal.

15. Receiver for deriving a received signal from a channel output signal that is a combination of a main signal and an auxiliary signal, the receiver having a sensitivity which depends on the difference between the polarization direction of the channel output signal and a reference polarization direction; said receiver including a control system which comprises: means for deriving a difference signal corresponding to a difference value between a parameter of the received signal and a reference value, means for deriving a correction signal from the difference signal, and means for reducing the difference value in response to the correction signal, the bandwidth of the control system exceeding that of the auxiliary signal; the receiver further including means for deriving the auxiliary signal from the difference signal, and means for reducing the difference between the polarization direction of the channel output signal and the reference polarization direction in response to the auxiliary signal, so as to obtain an auxiliary signal having maximum amplitude.

* * * * *